United States Patent [19]
Deguchi et al.

[11] Patent Number: 5,754,713
[45] Date of Patent: May 19, 1998

[54] IMAGE-READING DEVICE

[75] Inventors: Masanobu Deguchi, Kashiba; Hirokazu Izumi, Soraku-gun; Koji Oku, Yamatokoriyama; Katsumi Nakanishi, Nara; Harumi Katayama; Keiji Nobuhara, both of Yamatokoriyama, all of Japan

[73] Assignee: Sharp Kabushiki Kaisha, Osaka, Japan

[21] Appl. No.: 615,086

[22] Filed: Mar. 14, 1996

[30] Foreign Application Priority Data

Apr. 21, 1995 [JP] Japan ............................ 7-096862

[51] Int. Cl.⁶ .................................................. H04N 1/04
[52] U.S. Cl. .................... 382/313; 382/315; 358/473; 358/452
[58] Field of Search ............................ 358/452, 447, 358/448, 453, 473, 474, 400; 382/313, 321, 315; 250/208.1; H04N 1/04

[56] References Cited

U.S. PATENT DOCUMENTS

| | | |
|---|---|---|
| 4,833,721 | 5/1989 | Okutomi et al. |
| 5,264,947 | 11/1993 | Nishikawa et al. ............... 358/473 |
| 5,278,673 | 1/1994 | Scapa et al. ...................... 358/473 |
| 5,327,503 | 7/1994 | Kiyohara ........................... 382/313 |
| 5,355,146 | 10/1994 | Chiu et al. ......................... 345/156 |
| 5,361,141 | 11/1994 | Aoyama ............................ 358/452 |
| 5,365,605 | 11/1994 | Hosogoe et al. .................. 382/59 |
| 5,550,938 | 8/1996 | Hayakawa et al. ............... 358/473 |

FOREIGN PATENT DOCUMENTS

| | | |
|---|---|---|
| 62-154959 | 7/1989 | Japan. |
| 2-198270 | 8/1990 | Japan. |

*Primary Examiner*—Kim Vu

[57] ABSTRACT

An image-reading device is provided with a case having an empty section, a scanner for scanning an original so as to output image data derived from the original by reciprocally moving inside the empty section, a transparent reading-use window that faces the reading region of the original with respect to the scanner, and a transparent confirming-use window that is formed in the case so as to face the reading-use window, with the empty section located in between. This device enables visual confirmation of the original through the reading-use window, the empty section and the confirming-use window. Therefore, the device allows the operator to confirm a positional relationship between the reading-use window that forms the image-reading surface for the scanner and the original to be read through visual observation, readily as well as accurately. Thus, the device makes it possible to readily output the image data accurately.

12 Claims, 9 Drawing Sheets

| ☐ XXXXXXXXXXX | ☐☐☐☐YEAR ☐☐MONTH☐☐DATE | ◯◯ NEWSPAPER |
| ☑ YYYYYYYY | ☐☐☐☐YEAR☐☐MONTH☐☐DATE | ◯◯ NEWSPAPER |
| ☐ ZZZZZZZZZZ | ☐☐☐☐YEAR☐☐MONTH☐☐DATE | ◯◯◯◯NEWSPAPER |

1

IMAGE-READING DEVICE

FIELD OF THE INVENTION

The present invention relates to an image-reading device which reads image data from an original that is supplied to an image-output apparatus such as a digital copying machine and a printer. More particularly, it relates to a portable-type image-reading device that is provided as a device separate from that of the image-output apparatus.

BACKGROUND OF THE INVENTION

Conventionally, image-reading devices of the fixed type, that have an image-reading surface disposed upwards and that reads image data from an original placed face-down onto the image-reading surface, are well known.

These image-reading devices are designed so that an entire image that has been set onto the entire image-reading surface is converted into image data and outputted. Therefore, it is not convenient to use the image-reading devices of this type for reading only image data from originals having small sizes, such as articles of newspapers and books, or from one portion of the surface of an original.

In order to reduce the above-mentioned inconvenience, Japanese Laid-Open Patent Publication No. 198270/1990 (Tokukaihei 2-198270) has proposed a portable-type image-forming apparatus as an image-reading device that has a document-reading surface that is placed downward face to face with an original that is set face up so that it can read image data from the original.

This image-forming apparatus is provided with a scanner section and an image-display section, and the image data, read by the scanner, is displayed on the image-display section. Further, in the image-forming apparatus, when a particular region is specified on the display surface of the image-display section that is displaying an image read from an original, a trimming or masking process can be carried out with respect to the image on the display surface in accordance with the specified region.

However, the above-mentioned conventional image-forming apparatus has a problem in which, since the face of the original from which an image is to be read is covered with the apparatus, the operator cannot properly confirm the positional relationship between the image-reading surface and the original. Therefore, it is not until the image data from the original has been displayed on the image-display section that a judgement is made as to whether or not the positional relationship is an appropriate one.

For this reason, in the above-mentioned apparatus, the operator has to adjust the positional relationship based on his or her assumption when the positional relationship is not appropriate, and must make a judgement again after the image data, read from the original by the scanner section, has been again displayed on the image-display section. Thus, the problem of the above-mentioned apparatus is that it is difficult to determine the positional relationship readily as well as appropriately.

In addition, in the case when, for example, upon preserving news articles, an article is read together with the date and the newspaper's name thereof so as to output them onto one sheet of paper, or articles from a plurality of the newspapers are read on the same incident so as to output them onto one sheet of paper, the above-mentioned apparatus fails to provide accurate positioning with respect to the respective originals. Thus it is difficult to arrange the various image data in a proper manner to be read, since excess of margin portions tends to appear or since partially overlapped portions tend to appear among the images.

Conventionally, when a plurality of image data are combined together, after the image data of the respective originals have been outputted separately, the operator has to carry out cutting and pasting operations with respect to the necessary portions of the images on the respective sheets of paper.

Therefore, another problem of the above-mentioned apparatus necessitating such operations is that troublesome, time-consuming operations are required for arranging a plurality of images in a proper manner to be read.

In particular, in the case when newspapers are used as originals, since articles in newspapers are irregularly disposed, the above-mentioned operations, which are required after the image data have been outputted from the respective articles, become more troublesome in the above-mentioned apparatus upon preserving the respective articles in a proper state to be read.

SUMMARY OF THE INVENTION

It is therefore an objective of the present invention to provide an image-reading device which allows the operator to confirm the positional relationship between the image-reading surface and an original to be read, readily as well as accurately, and which is capable of outputting desired image data from the original, readily as well as accurately.

It is another objective of the present invention to provide a portable-type image-reading device which is capable of rearranging a plurality of image data from an original easily without any excess or loss, and which is particularly suitable for preserving-jobs of newspaper articles.

In order to achieve the above-mentioned objectives, the image-reading device of the present invention is provided with:

a case having an empty section and a reading-use window that faces the empty section and that is formed on one surface of the case; and a scanner that is placed inside the case so as to face an original through the reading-use window and that reads the original and outputs image data from the original.

wherein the case is provided with a confirming-use window that is formed through the case so as to face the reading-use window with the empty section located in between.

In this arrangement, the case is placed on the original so that the reading-use window faces the original to be read. Thus, the scanner reads an image of the original through the reading-use window, and outputs the image data from the original.

In this case, the operator of the device can readily confirm by visual observation the original that is to be read by the scanner through the reading-use window, the empty section and the confirming-use window. Therefore, since the device allows the reading-use window to be placed on an appropriate position on the original, readily as well as easily, it becomes possible to output desired image data from the original, readily as well as accurately.

The above-mentioned device is further provided with an image storage section for storing the image data and an image-display section for displaying the image data that has been stored.

In this arrangement, after the scanner has carried out a reading operation from an original, the image data, read from the original, is stored in the image storage section, and the document data is displayed on the image-display section. Therefore, it is possible to confirm the read image by using the image-display section, with the case being placed on the document. This makes it possible to further ensure the positioning of the original to be read.

In the above-mentioned device, the confirming-use window is further provided with a confirming-use region that faces a region that includes at least a reading-start position within the reading-use window.

In this arrangement, when the scanner section has carried out a reading operation of an original, the region within the original that has been confirmed by visual observation through the confirming-use window is displayed on the image-display section. Thus, the region within the original that has been subjected to the visual observation becomes coincident more accurately with the region within the original that has been subjected to the reading operation of the scanner, thereby making it possible to ensure the region of the original to be read by the scanner.

The above-mentioned device is further provided with an edit input means to which instructions, which concern a regional pattern of an image displayed on the image-display section and a regional pattern that has been subjected to an editing operation, are inputted and an edit means that edits the image of the original that has been read by the scanner in accordance with the regional pattern that has been instructed and inputted by the edit input means.

In this arrangement, the read image can be edited by the edit means in accordance with the regional pattern of the image and the regional pattern that has been subjected to the editing operation, both of which have been instructed and inputted. Therefore, since the instructions of regions can be simplified particularly when editing images on an original having articles that are irregularly disposed, such as a newspaper, a plurality of image data can be easily combined without any excess and loss.

In the above-mentioned device, the edit means is further provided with an image recognition means for recognizing regions of images that have been read by the scanner based on their respective items, and an edit section for editing the images of the respective originals that have been read by the scanner, in accordance with the results of recognition made by the image recognition means.

In this arrangement, the image recognition means recognizes the regions of images based on their respective items in the image data of the read images, and the images are edited by the edit section in accordance with the results of recognition. Therefore, in the case when an original consisting of a plurality of regions that are different in document items is read, the images can be classified into respective document items and edited in a proper state so as to be easily read.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For a fuller understanding of the nature and advantages of the invention, reference should be made to the ensuing detailed description taken in conjunction with the accompanying drawings.

DESCRIPTION OF THE EMBODIMENT

Figure 1:
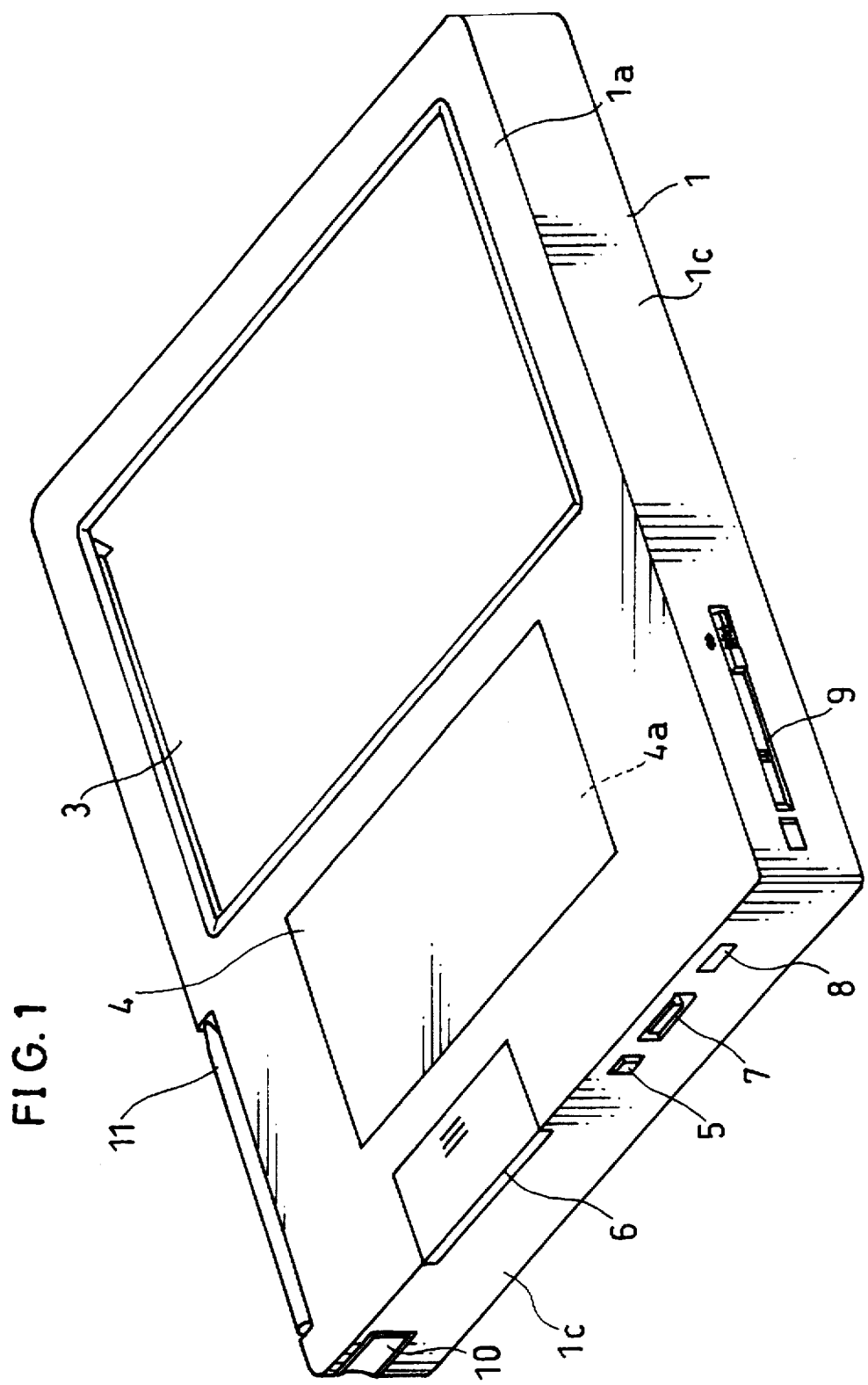
FIG. 1 is a perspective view that includes a confirming-use window in an image-reading device of the present invention.
Figure 2:
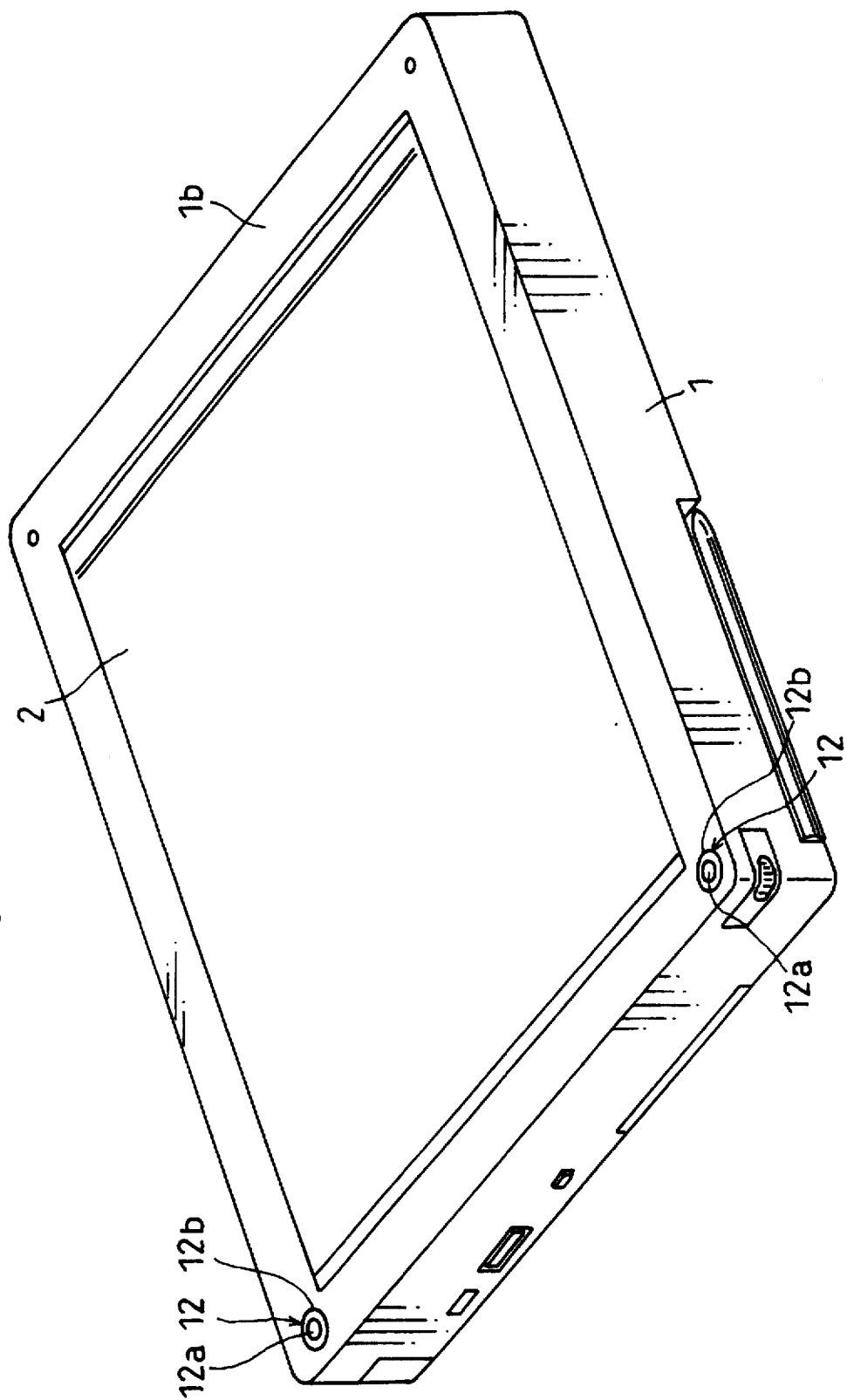
FIG. 2 is a perspective view that includes a reading-use window in the image-reading device.

As illustrated in FIGS. 1 and 2, an image-reading device of the present invention is provided with a case 1 that has a flat, rectangular parallelopiped shape. The case 1 has a confirming-use window 3 and a liquid crystal display section 4 on its upper surface 1a that is one of the end faces of the case 1 in the depth direction. A reading-use window 2 is provided on the bottom surface 1b that is the opposite face to the upper surface 1a of the case 1. Ball sensors 12 are placed close to the reading-use window 2. Each of the reading-use window 2 and the confirming-use window 3 has a transparent glass plate in the shape of a rectangular plate.

Each of the ball sensors 12 has a ball portion 12a that supports the case 1 so as to move it by its rotation in parallel with the surface of the reading-use window 2. Each of the ball sensors 12 also has a ball-detecting section 12b that detects the movement of the case 1 in relation to an original.

Therefore, when the case 1 is moved on the original in parallel therewith, the ball sensors 12 allow the case 1 to move easily thereon with the ball portions 12a rotating while kept in contact with the original or the surface on which the original is placed. The ball sensors 12 also detect the moving distance and moving direction of the case 1 by using the ball-detecting sections 12b that detect the rotation of the ball portions 12a.

The reading-use window 2, which virtually covers the entire portion of the bottom surface 1b, is set to have a document size of, for example, A4 (21 cm in width, 29.7 cm in length), and allows an image of an original having a larger size to be read through the reading-use window 2 by the use of a scanner, which is described next. In such an image reading operation, the scanner scans the original from one of the shorter sides of the reading-use window 2 to the other shorter side in parallel with the longer sides of the reading-use window 2, thereby allowing the image to be read. Hereinafter, the position of one of the shorter side is referred to as a reading-start position, and the position of the other shorter side is referred to as a reading-end position.

The confirming-use window 3 is set to have a size of virtually one-half of the entire portion of the upper surface 1a with respect to the reading-use window 2, and designed to include at least a station facing the reading-start position of the reading-use window 2 of the upper surface 1a.

The liquid crystal display section 4, which has a shape similar to the confirming-use window 3, displays an image that is located within a range that can be viewed through the confirming-use window 3 of the upper surface 1a among images that have been read through the reading-use window 2. A transparent touch switch 4a is affixed to the upper surface of the liquid crystal display section 4. The touch switch 4a functions as a tablet that is used for inputting coordinates on the liquid crystal display section 4 to a control section, which will be described later.

Moreover, on the side face 1c of the case 1 are respectively provided a power-input terminal 5, a battery lid 6, an output terminal 7, a power switch 8, an IC-card inserting section 9, a read switch 10 and a touch pen 11.

The power-input terminal 5, to which a power line, not shown, is externally connected, supplies power to respective members in the case 1. The output terminal 7, to which a data line, not shown, is connected, is used to output image data that have been read to an external apparatus such as a printer. The power switch 8 turns the power on and off with respect to the respective members.

An IC card is inserted through the IC-card inserting section 9. The IC card is used as an external storage medium for image data. Upon contacting the touch switch 4a affixed to the liquid crystal display section 4, the touch pen 11 inputs coordinates on the liquid crystal display section 4 to the control section, which will be described later.

The read switch 10 is used to instruct and input the start of a reading operation of images through the operator's instruction. Since the read switch 10 is provided on a corner of the side face 1c of the case 1, it is easy for the operator to handle it even when the case 1 is used with the bottom surface 1b having the reading-use window 2 facing up.

Figure 3:
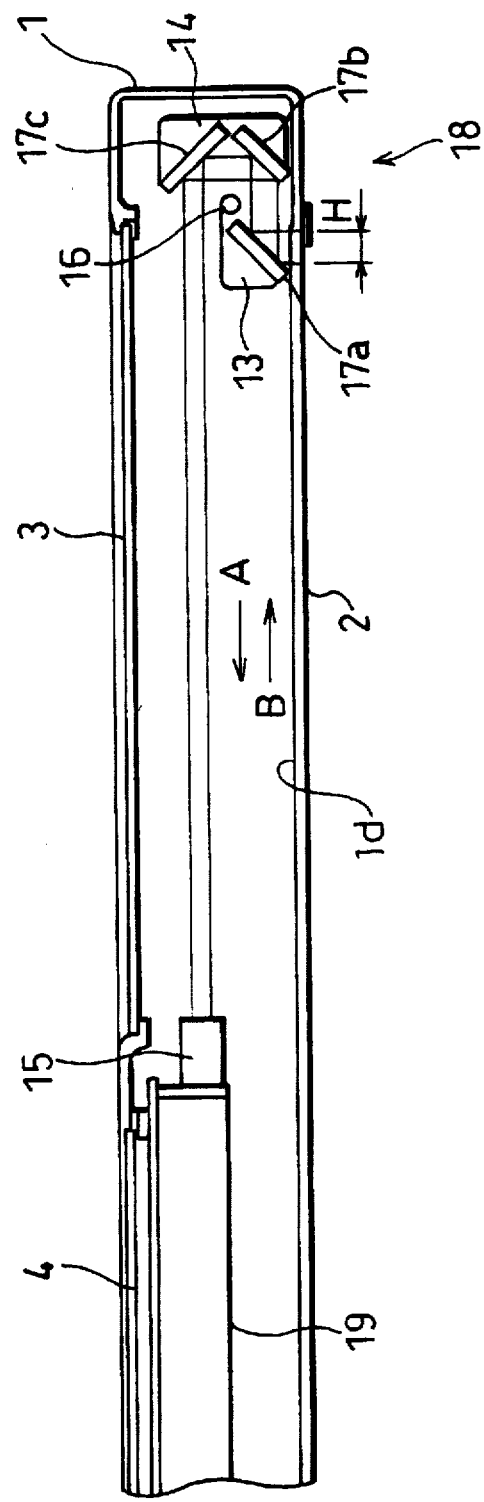
FIG. 3 is a cross-sectional view of an essential part in the image-reading device.

As illustrated in FIG. 3, the scanner 18, which reads an image of an original and converts the image into image data so as to release it, is installed in the shape of a line that corresponds to the width of the shorter side of the reading-use window 2. The scanner 18 is designed to move reciprocally in the directions indicated by arrows A and B that are the lengthwise directions of the reading-use window 2, in parallel with the surface and shorter sides of the reading-use window 2. The scanner 18 is constituted of a light-source unit 13 having a light source 16 and a mirror 17a, and a mirror base 14 on which mirrors 17b and 17c are installed.

The mirrors 17a through 17c are arranged so that light, which is irradiated from the light source 16 and reflected by the original, is aligned with respect to a CCD (Charge Coupled Device) line sensor 15. The CCD line sensor 15 converts the reflected light that has been incident thereto into image data and releases the image data.

The travel speed of the light-source unit 13 is set to be twice as fast as the travel speed of the mirror base 14 when the scanner 18 scans the original. The mirror base 14 travels the distance corresponding to one-half of the longer side of the reading-use window 2 while the light-source unit 13 has travelled from the reading-start position to the reading-end position of the reading-use window 2. Thus, the light-path distance from the original to the CCD line sensor 15 is kept constant.

Moreover, between the confirming-use window 3 and the reading-use window 2 in the case 1, which are located above the region in which the mirror base 14 moves, is provided an empty section 1d in which the light-source unit 13 and the mirror base 14 are allowed to move. Therefore, the operator can readily confirm images of the original placed in the location facing the lower side of the reading-use window 2 by visual observation through the confirming-use window 3 and the reading-use window 2 from the upper side of the case 1.

Here, the confirming-use window 3 is designed to face the reading-use window 2 in the depth direction of the case 1 and also to include at least the reading-start position of the reading-use window 2. This makes it possible for the operator to confirm the reading-start position of the original by visual observation even when viewing the case 1 diagonally from above.

Inside the case 1, at a region that faces the range in which only the light-source unit 14 moves and that is located outside the travel range of the mirror base 14, is installed a control section 19, which is a circuit unit. Further, the liquid crystal display section 4 is placed at a portion of the upper face 1a of the case 1 that faces the above-mentioned region.

Figure 4:
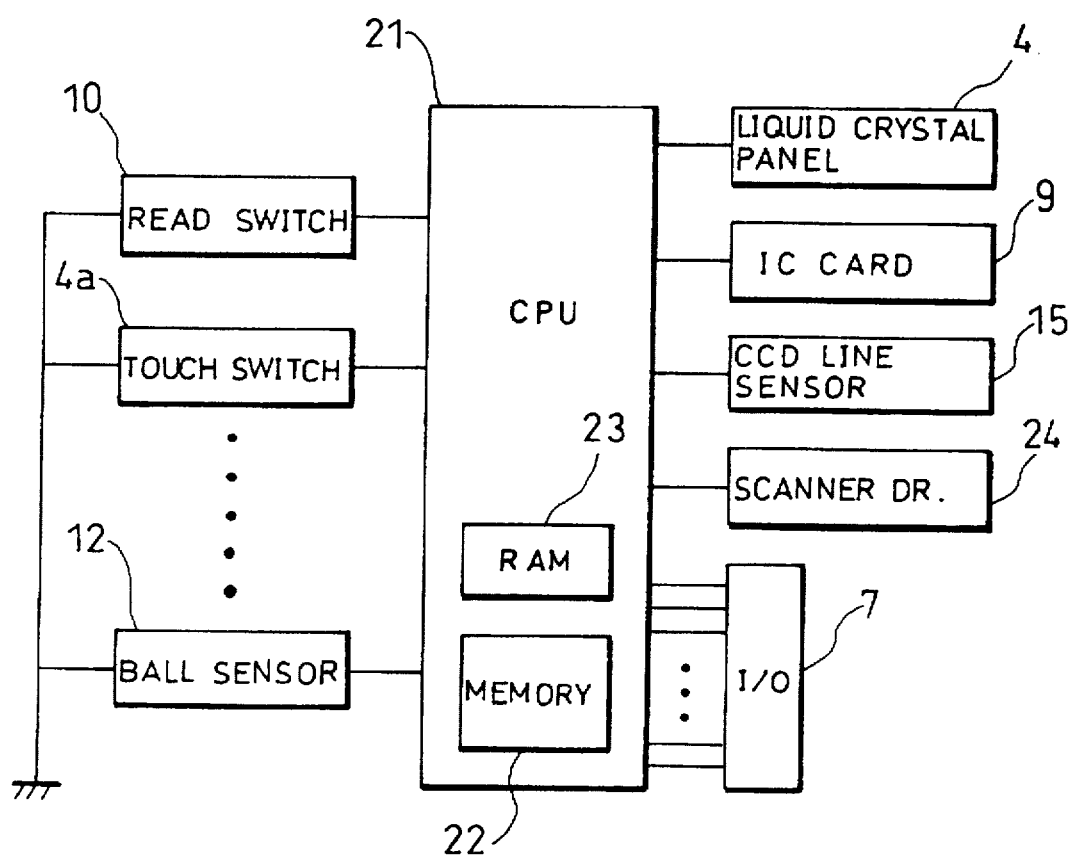
FIG. 4 is a block diagram showing a control section in the image-reading device.
Figure 5:
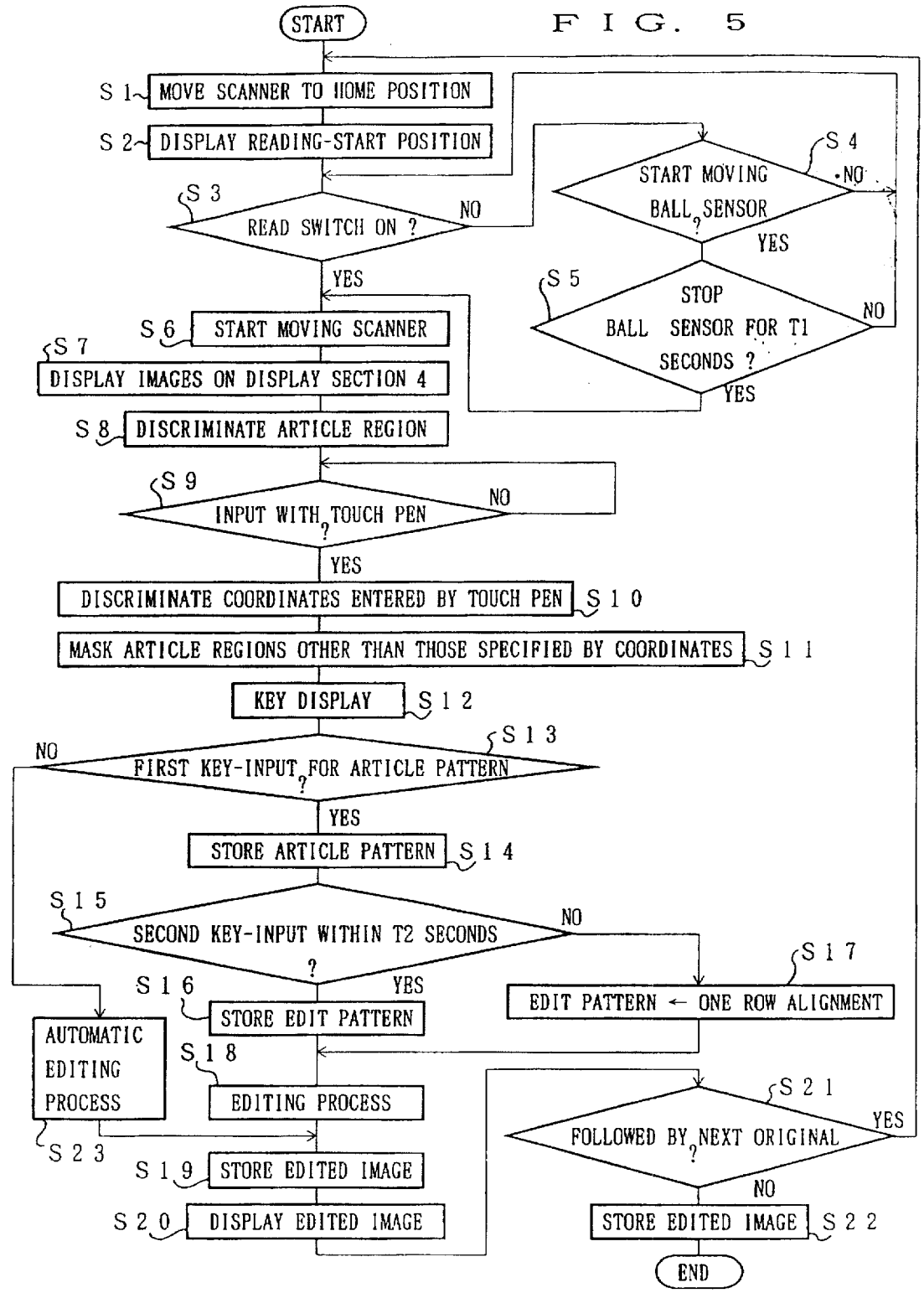
FIG. 5 is a flow chart that shows a sequence of processes in the control section.

The control section 19 is provided with a CPU (Central Processing Unit) 21, a memory 22 for storing programs that operate the CPU 21, and a RAM (Random Access Memory) 23 for storing image data (see FIG. 4). The CPU 21 is connected to the liquid crystal display section 4, the touch switch 4a, the output terminal 7, the IC-card inserting section 9, the ball sensors 12, the CCD line sensor 15 and the scanner driver 24. The CPU 21 systematically controls the above-mentioned input-output devices.

In the image-reading device of the present invention, analog image data, which has been released from the CCD line sensor 15, is converted into digital image data so that it is readily subjected to image processing, such as storing and editing. With respect to such processing circuits for digitization, for example, a shading process circuit, an A/D conversion circuit and a binary processing circuit are listed (see U.S. patent application Ser. No. 08/152.975).

In the image-reading device of the present invention, the CPU 21 carries out an image analysis for recognizing images, such as extraction and combination of edge and line elements, a shape analysis and other analyses (see U.S. Pat. No. 4,833,721).

Next, referring to FIGS. 1 through 5, the following description will discuss an operation of the image-reading device by reference to an example wherein newspaper articles are read as originals.

First, the case 1 is set by the operator through visual observation so that the reading-start position is coincident with a leading portion H of an original to be read while the reading-use window 2 is maintained to face the original.

Successively, when the read switch 10 is operated, the CPU 21 allows the scanner 18 to move from a waiting position that is located between the CCD line sensor 15 and the reading-use window 2 to a home position (the reading-start position) that is shown in FIG. 3 (Step 1: hereinafter, Step is abbreviated to S).

Next, while the scanner 18 is maintained at the home position, the CPU 21 allows the liquid crystal display section 4 to display images that the CCD line sensor 15 has read as the leading portion H that is located from the home position to a predetermined position with respect to the leading portion H of the original that faces the mirror 17a of the scanner 18 (S2).

As described above, the image of the leading portion H of the original, read by the scanner 18 that is located at the home position, is displayed on the liquid crystal display section 4. Thus, prior to a scanning operation to be carried out by the scanner 18, the setting position of the case 1 with respect to the original can be confirmed by visual observation through the confirming-use window 3, roughly but quickly. In addition, by the use of the contents of display on the liquid crystal display section 4, a further judgement can be made more positively.

In this state, the CPU 21 monitors the operation of the read switch 10, or monitors the travelling and stopping states of the case 1 during a given time through the ball sensors 12 (S3 through S5). When the read switch 10 is operated again or when the ball sensors 12 has detected the stoppage of the case 1 for the given time, the CPU 21 makes a judgement that the positioning of the case 1 on the original has been complete, and starts to move the scanner 18 (S6).

As described above, since the ball sensor 12 detects the stoppage of travel of the case 1 on the original and automatically starts the reading operation of images, it becomes possible to simplify the reading operation of images. This automatic starting process may be modified so as to be cancelled by a switch, not shown.

Figure 6:
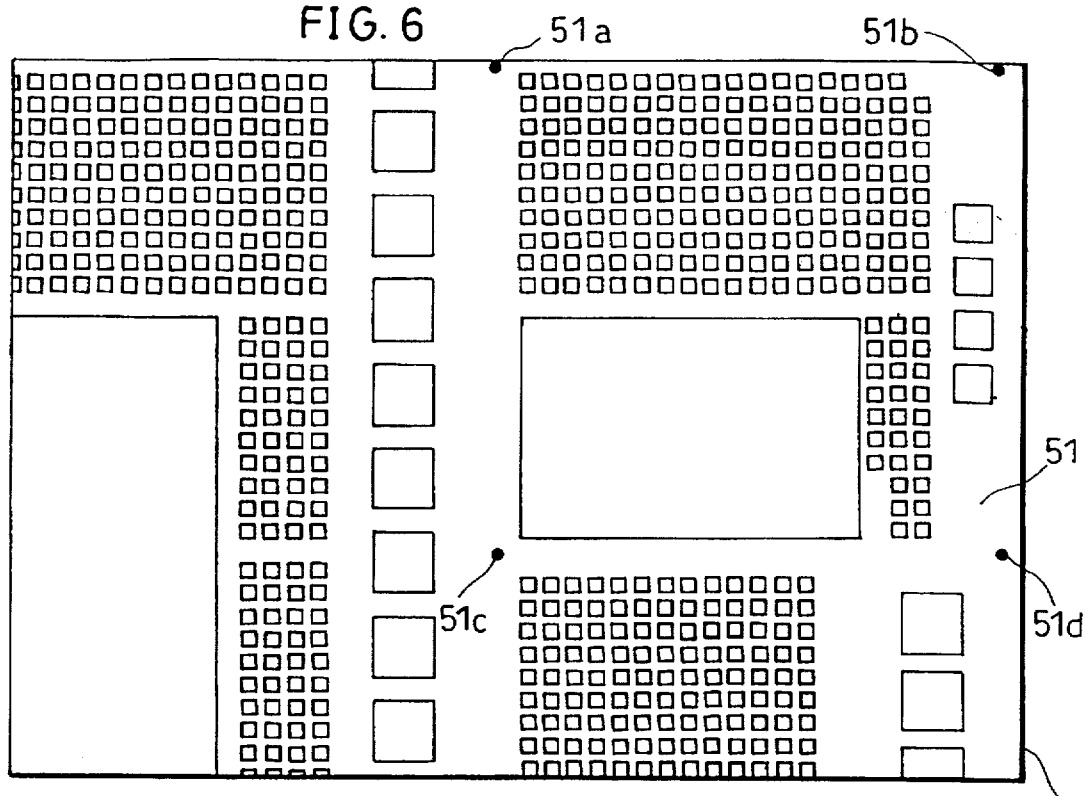
FIG. 6 is an explanatory drawing that shows a display example of the liquid crystal display section in the image-reading device.

Next, the CPU 21 displays on the liquid crystal display section 4 the image that has been read by the scanning operation carried out by the movement of the scanner 18 (S7), and carries out a discrimination operation on article regions (S8). Further, when coordinates are inputted on the liquid crystal display section 4 through the touch pen 11 and the touch switch 4a, the CPU 21 discriminates the inputted coordinates (S10), and carries out a masking operation with respect to areas other than the coordinate region (S11). For example, as shown in FIG. 6, when a specified region 51 is determined by providing respective operation points 51a, 51b, 51c and 51d as a rectangular region by the use of the touch switch 4a, the areas other than the specified region 51 is erased.

Figure 7:
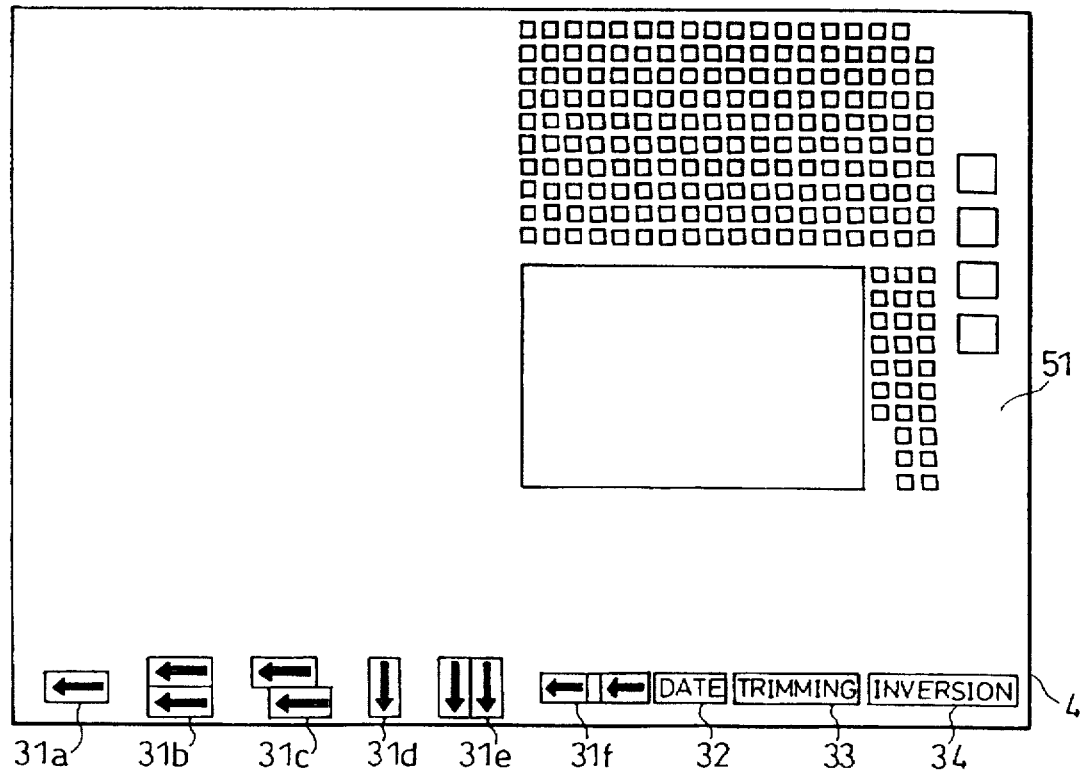
FIG. 7 is an explanatory drawing that shows a display example of the liquid crystal display section that is obtained after the display example of the above-mentioned display example has been subjected to a trimming operation.

Thereafter, as shown in FIG. 7, the CPU 21 displays, for example, article-pattern keys 31a through 31f of six types and editing keys 32 through 34 of three types in the form of icons at the lowermost portion of the touch switch 4a (S12), and provides a stand-by state for key entries related to the editing operation of images.

The article-pattern key 31a represents a pattern for one-block arrangement; the article-pattern key 31b represents a pattern for two-column arrangement; the article-pattern key 31c represents a pattern for two-block arrangement wherein the starting positions of the first block and the second block are different from each other; the article-pattern key 31d represents a pattern consisting of sentences that continue from the top to the bottom with a constant width; the article-pattern key 31e represents a pattern consisting of two columns of sentences, each of which continues from the top to the bottom with a constant width; and the article-pattern key 31f represents a pattern which includes an unnecessary portion, such as an advertisement, in the middle of sentences that continue from right to left. These article-pattern keys 31a through 31f constitute the edit input means of the present invention.

The CPU 21 stores the contents of one of the article-pattern keys 31a through 31f that has first been operated as an article pattern in the specified region 51 (S13, S14), and also stores the contents of one of the article-pattern keys 31a through 31f that has second been operated before a predetermined period of time has elapsed as an editing pattern (S15, S16).

For example, in the case shown in FIG. 7, if the article-pattern key 31b is first operated and no key operation among the article-pattern keys 31a through 31f has second been made before the predetermined period of time has elapsed, the lateral one-block arrangement is stored as the editing pattern (S17). The CPU 21 divides image data of the specified region 51 into a plurality of blocks in accordance with the article pattern, and carries out an editing operation by rearranging the divided image data in accordance with the edit pattern (S18). The CPU 21 stores the image data thus edited in the RAM 23 (S19), and displays the corresponding image on the liquid crystal display section 4 (S20).

Moreover, in the case where related originals, such as definitions and explanatory notes about words in the article, or articles in other newspapers about the same incident, are successively read, the processes of S1 through S20 are successively carried out by using the lower portion of the display region of the edited image data on the liquid crystal display section 4 as a display region.

Figure 8:
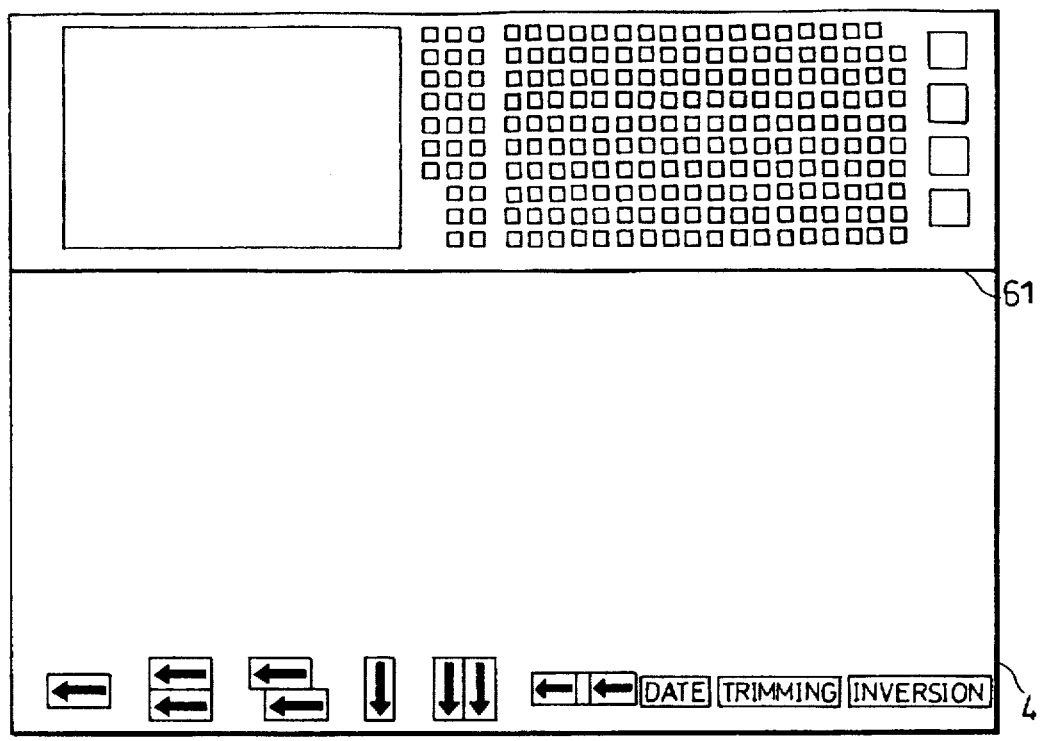
FIG. 8 is an explanatory drawing that shows a display example of the liquid crystal display section that is obtained after the display example of the above-mentioned display example has been subjected to an editing operation.
Figure 9:
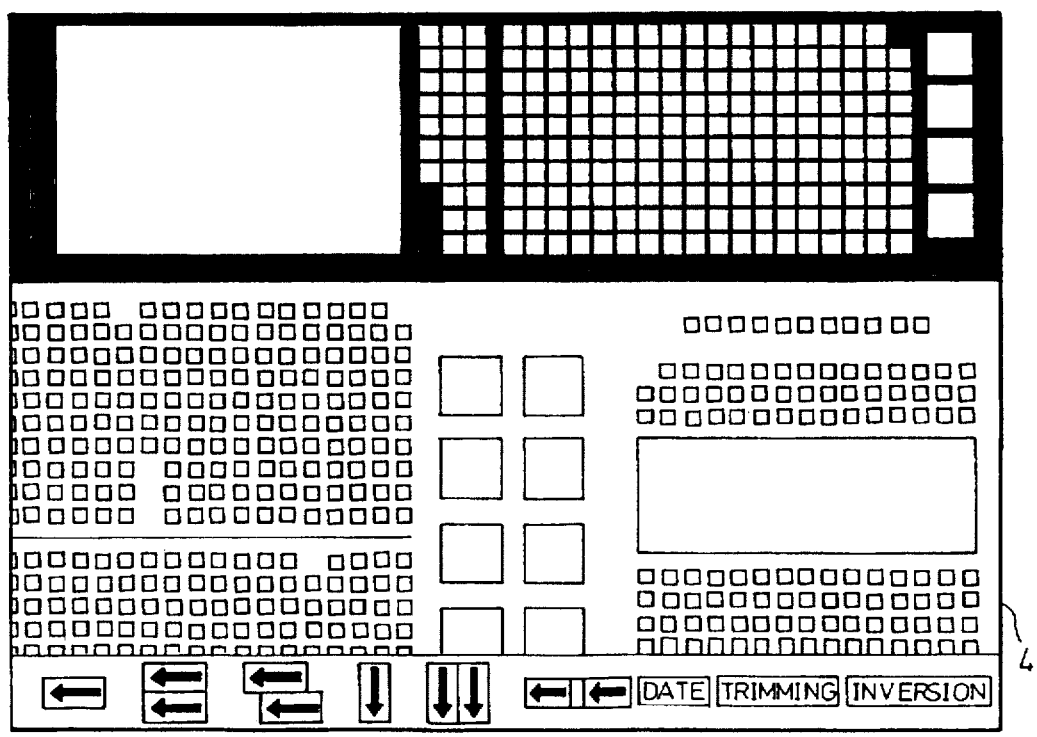
FIG. 9 is an explanatory drawing that shows a display example of the liquid crystal display section that is obtained after originals have been read.

In this case, in order to clearly distinguish the image presently read from the image previously read, for example, a border line 61 is displayed under the image previously read as shown in FIG. 8, or the image previously read is displayed in an inverted manner on black and white, as shown in FIG. 9.

Additionally, since the edited image data is stored in the RAM 23 immediately after the editing operation has been completed (S19), it is possible to prevent the image data that has been subjected to the editing operation from being lost, even if, upon editing images of the next original, the image that has been subjected to the editing operation is erroneously erased from the liquid crystal display section 4.

The image data, thus edited, is written onto an IC card through the IC-card inserting section 9 (S22). Moreover, if no key-in operation of the article pattern is made through the article-pattern keys 31a through 31f, the CPU 21 carries out an automatic editing operation (S23). The above-mentioned processes S9 through S21 can relate, for example, to the edit means of the present invention.

Additionally, in the case when a plurality of image-reading operations are repeatedly carried out, it is assumed that the amount of image data to be read exceeds the display region of the liquid crystal display section 4. In this case, only the leading one line through several lines of the image that has been subjected to the editing operation may be preferably displayed on the liquid crystal display section 4, depending on the operator's selection.

Figure 10:
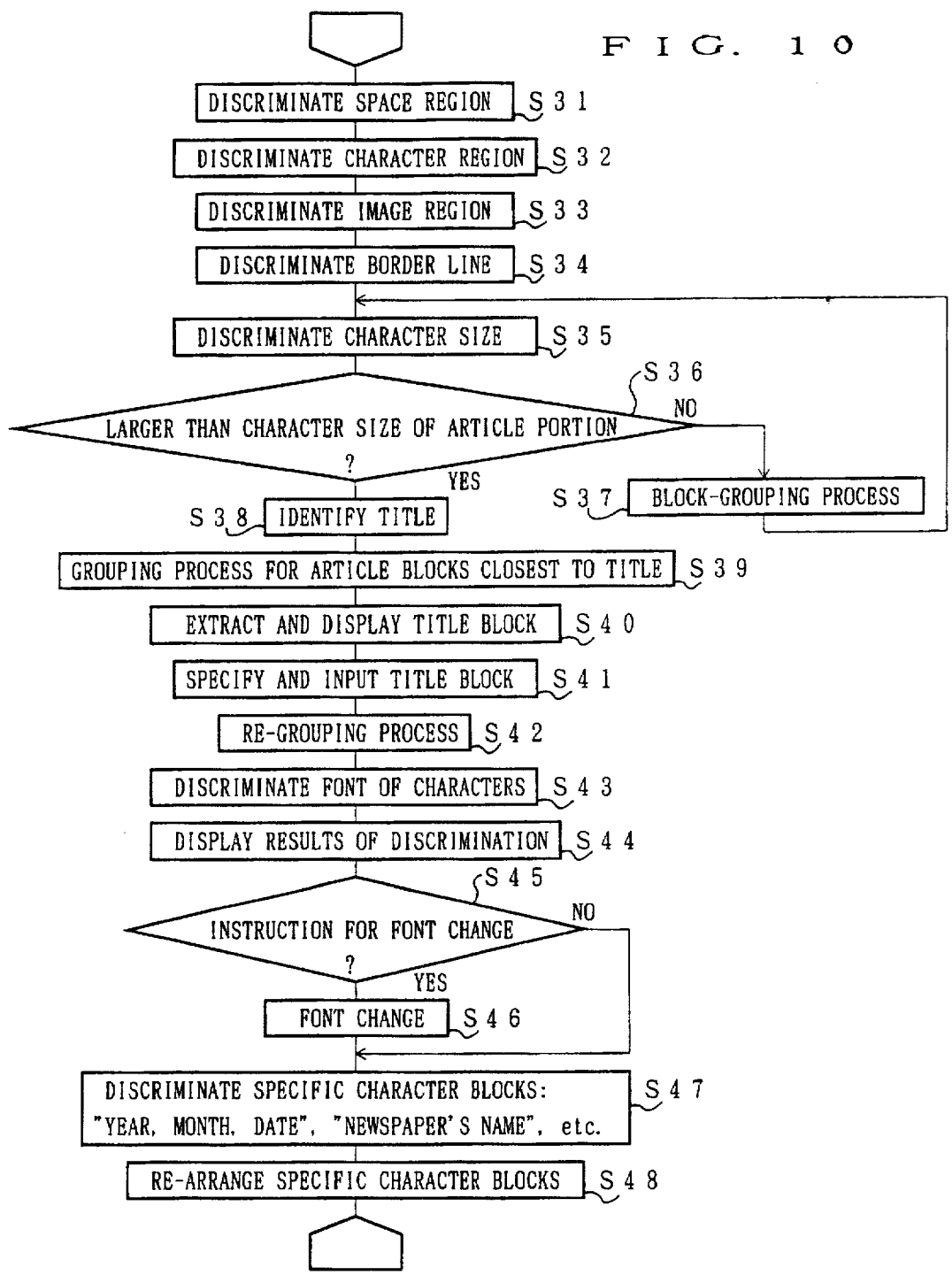
FIG. 10 is a flow chart showing a sequence of processes that are carried out during an automatic editing operation in the control section.

Referring to FIG. 10, the following description will discuss respective operations related to the above-mentioned automatic editing processes. In the case where no key-in operation of the article pattern is made by the operator with respect to the image displayed on the liquid display section 4, the CPU 21 first carries out the automatic editing processes. In these automatic editing processes, the CPU 21 divides the specified region 51 into a plurality of information blocks, each of which is an information group having a predetermined continuity.

Upon discriminating these groups, the CPU 21 selectively carries out any one or some of a plurality of processes including a space-region discrimination process (S31), a character-region discrimination process (S32), an image-region discrimination process (S33), a border-line discrimination process (S34), and a character-size discrimination process (S35).

The space-region discrimination process is a process wherein a region surrounded by a continuous blank portion is regarded as one block.

The character-region discrimination and image-region discrimination processes are processes wherein, after bit-map data that constitutes image data has been divided into small regions, the density distribution is calculated in each of the small regions. Then small regions whose density distribution of intermediate gradation is not more than a predetermined value are determined as character small regions, and small regions whose density distribution of intermediate gradation is more than the predetermined value are determined as image small regions. Thus, a portion wherein the same small regions continuously appear is determined as one block.

The border-region discrimination process is a process wherein a range that is separated by a continuous line pattern, such as a solid line and a broken line, is determined as one block.

The character-size discrimination process is a process wherein character sizes are discriminated within the specified region 51 by using a well-known print-character recognition function for recognizing print characters. Further, in the character-size discrimination process, a region that has continuous characters whose size is larger than the character size of article portion is determined as a title block (S35 through S38). Additionally, if a region in question has characters whose size is the same as the character size of article portion, the region is amalgamated with adjacent regions into one group (S37).

Moreover, a title block and the article block that is the closest to the title block is amalgamated into one group (S39), and this entire group is determined as one block. The CPU 21 extracts the title blocks thus discriminated, and displays them on the liquid crystal display section 4 (S40). Then the display is ready for an input instruction for the title through the touch pen 11 (S41), and the title blocks, which have been specified through the operation of the touch pen 11, are placed in succession from the furthest right side, and then the above-mentioned grouping processes are again carried out.

With this process, each title is disposed on the right side of the related article, and the images of the original can be arranged so as to be easily read. Here, when a plurality of title blocks are to be disposed, they may be preferably arranged in succession from right to left in order of decreasing sizes of characters.

Next, the CPU 21 discriminates the font of printing types that have been read (S43). This font discrimination process is provided so that the font can be changed by the specified operator's selection. Accordingly, even if the same character size is used, the area in the image region that is to be occupied by the title can be reduced by changing the font of printing types. The CPU 21 displays the results of the font discrimination process on the liquid crystal display section 4 (S44), and if the operator specifies a change in fonts, the specified font is used (S44, S45).

Thereafter, a discrimination process is carried out on specific character blocks (S46). For example, the discrimination process on specific character blocks is like this: If a character string "Year: Month: Day:" is found, this is discriminated as a "Date of Issue" block. If a character string "Newspaper" is found at the last portion, this is discriminated as "Newspaper Name" block. Here, with respect to information including proper nouns, such as magazine names and publisher's names, such information may be discriminated as information blocks including proper nouns, by making comparisons with data that have been preliminarily stored in an external memory such as a RAM 23 or an IC card.

If the CPU 21 makes a decision that there is a specific character block including a date of issue and a newspaper's name in article data that have been read, it places the specific character block at the uppermost portion of the article data so as to be displayed, and stores the rearranged image data (S47). Thus, it becomes possible to simplify the scrapbook-making job for newspaper articles by placing the date of issue and the newspaper's name of newspaper articles that have been read at predetermined positions (S48).

Additionally, the CPU 21 is preferably arranged so that, in the case when no specific character block has been extracted from image data that have been read, it reads, automatically, or in accordance with the operator's instruction entered through a date key 32 (see FIG. 7), the date of a day in question by using the calendar function of the CPU 21, not shown, and places the image data having the date of the day in question at the uppermost portion of the edited image data.

Figures 11, 12:
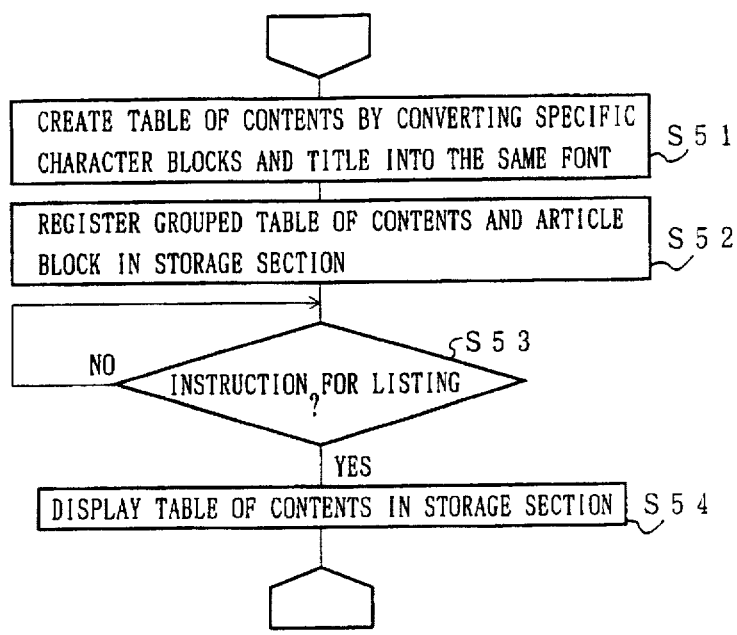
FIG. 11 is a flow chart showing a sequence of processes that are carried out during a formation of a table of contents in the control section.
FIG. 12 is an explanatory drawing that shows a display example of a list on the liquid crystal display section that corresponds to the above-mentioned table of contents.

Moreover, as shown in FIG. 11, the character data included in specific character blocks and the character data included in title blocks are converted into a predetermined font with a predetermined size so as to make table-of-contents data (S51), and the table-of-contents data is stored in the RAM 23 in relation to the image data (S52). In accordance with the operator's instruction for displaying the image list, only the table-of-contents data is extracted from the RAM 23, and the table-of-contents data is displayed on the liquid crystal display section 4 in the form of a list (S53, S54), as shown in FIG. 12. This process makes it possible to simplify the image-data retrieval and also to eliminate an additional operation to create table-of-contents data.

For example, in the case when images that belong to a plurality of regions on a newspaper are read by using the image-reading device of the present invention, the case 1 sometimes needs to be rotated by 90° or 180° with respect to the images, with the newspaper kept in a fixed state. In such a case, the liquid crystal display section 4 is held in a state rotated by 90° or 180° with respect to the operator, resulting in difficulty in viewing the contents of the display of the liquid crystal display section 4.

In order to solve this problem, the display of images is preferably rotated by 90° or 180° by operating the touch switch 4a, that is, through an operation such as a depressing operation of one corner of the touch switch 4a on the liquid crystal display section 4 by the use of the touch pen 11. This arrangement makes it possible for the operator to easily confirm the contents of display on the liquid crystal display section 4, and also to provide fast, simplified editing operations.

As described above, the present embodiment makes it possible to simplify and shorten the scrapbook-making job for newpaper articles to a great degree. Moreover, with respect to originals other than newspaper articles, it becomes possible to simplify and shorten the confirming jobs on the reading position of the original as well as to make those jobs more functional.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An image-reading device comprising:

a casing, including
        a reading-use window, formed on a first surface of the casing, through which an original can be scanned,
        a confirming use window, formed on the second surface of the casing opposite the first surface, through which an original can be viewed, and
        a central section formed between the first surface and the second surface, at least a portion of which is empty to allow for the viewing of the original through the reading-use and confirming use window;

a scanner, located in the central section of the casing, for reading an image of an original, for converting the image into image data representative of the original and for outputting the image data, the scanner being placed inside the casing so as to output a scanning beam through the reading-use window to read the original; and an image display section for displaying the image data output by the scanner, the image display section being formed at a position different from the confirming use window on the second surface of the casing.

2. The image-reading device of claim 1, wherein the scanner includes a light source and a CCD line sensor.

3. The image-reading device as defined in claim 1, wherein the confirming-use window comprises a confirming-use region that faces a region of the reading-use window, including at least a reading-start position within the reading-use window.

4. The image-reading device as defined in claim 1, further comprising:

edit input means for receiving input instructions regarding a regional pattern of an image displayed on the image-display section and a desired regional pattern; and edit means for editing the image of the original that has been read by the scanner in accordance with the instructions regarding the desired regional pattern received and inputted by the edit input means.

5. The image-reading device as defined in claim 4, wherein the edit means includes, image recognition means for recognizing regions of originals read by the scanner based on respective items present on the originals, and an edit section for editing the images of the respective originals read by the scanner, in accordance with the results of the recognition made by the image recognition means.

6. The image-reading device as defined in claim 5, wherein the respective items include title blocks indicating outlines of the regions of read images.

7. The image-reading device as defined in claim 1, further comprising:

detection means for detecting movement of the casing with respect to the original; and control means for controlling operations of the scanner by detecting a period of stoppage of the movement of the casing, in accordance with detections of the detection means.

8. The image-reading device as defined in claim 7, wherein the detection means includes, a ball section, supporting and allowing movement of the casing by rotation of the ball section; and a detection section for detecting the movement of the casing with respect to the original based on the rotation of the ball section.

9. The image-reading device as defined in claim 1, wherein the scanner includes, an optical detection section for scanning the original in a first direction and for outputting the image data derived from the original; and a scanning section for moving the optical detection section along the surface of the reading-use window in a second direction, orthogonal to the first direction, to scan the original.

10. The image-reading device as defined in claim 9, further comprising:

instruction means for instructing a starting operation of the scanner; and control means for controlling the scanning section to allow the optical detection section to move from a stand-by position to a reading-start position in accordance with the instructing of the instruction means.

11. The image-reading device a s defined in claim 9, further comprising:

detection means for detecting movement of the casing with respect to the original; and control means for controlling the scanning section to allow the optical detection section to move from a stand-by position to a reading-start position by detecting a period of stoppage of the movement of the casing, in accordance with detections of the detection means.

12. The image-reading device of claim 1, wherein the display section includes a display screen and a touch panel switch overlaying the display screen.

* * * * *